United States Patent [19]
Van Der Heijden et al.

[11] Patent Number: 5,293,809
[45] Date of Patent: Mar. 15, 1994

[54] METHOD OF LIMITING A CONTACT FORCE

[75] Inventors: Franciscus J. M. Van Der Heijden; Johan M. Bos, both of Eindhoven, Netherlands

[73] Assignee: U.S. Philips Corporation, New York, N.Y.

[21] Appl. No.: 886,678

[22] Filed: May 21, 1992

Related U.S. Application Data

[62] Division of Ser. No. 686,864, Apr. 15, 1991, Pat. No. 5,197,371.

[30] Foreign Application Priority Data

Apr. 28, 1988 [NL] Netherlands ............... 8800768

[51] Int. Cl.$^5$ ............................................. F15B 15/20
[52] U.S. Cl. ......................................... 91/392; 901/29; 901/49; 92/162 P
[58] Field of Search ............... 156/358, 359, 73.1; 901/29, 22, 49; 92/162 R, 162 P; 228/110, 1.1; 384/12, 99; 264/23; 91/392, 400

[56] References Cited

U.S. PATENT DOCUMENTS

| | | | |
|---|---|---|---|
| 3,522,761 | 8/1970 | Arneson, Jr. | 384/12 |
| 3,563,443 | 2/1971 | Pedrotti | 228/110 |
| 3,742,793 | 7/1973 | Gray et al. | 92/162 R |
| 4,048,004 | 9/1977 | Watkins | 228/1.1 |
| 4,197,786 | 4/1980 | Pillon | 92/162 R |
| 4,631,685 | 12/1986 | Peter | 156/64 X |
| 4,700,932 | 10/1987 | Katsuno | 901/29 X |
| 4,714,865 | 12/1987 | Chin et al. | 901/49 X |
| 4,795,306 | 1/1989 | Allan et al. | 901/29 X |

FOREIGN PATENT DOCUMENTS

| | | | |
|---|---|---|---|
| 0208310 | 1/1987 | European Pat. Off. | 228/110 |
| 2061883 | 6/1972 | Fed. Rep. of Germany | 92/162 |
| 3326138 | 1/1985 | Fed. Rep. of Germany | . |
| 2541163 | 8/1984 | France | 228/1.1 |
| 61-67584 | 4/1986 | Japan | 228/110 |
| 2000470 | 1/1979 | United Kingdom | 228/1.1 |

*Primary Examiner*—David A. Simmons
*Assistant Examiner*—Chester T. Barry
*Attorney, Agent, or Firm*—Norman N. Spain

[57] ABSTRACT

A force limiter for limiting the force with which two articles come into contact with each other, which force limiter comprises a control member (11) displaceable with respect to a holder (5), which member is pneumatically prestressed with a force which is substantially independent of the relative position between the holder (5) and the control member (11). The force limiter can be used in devices in which, after stopping a drive the contact force between the driven first article and the second article in contact therewith mustnot exceed a given threshold value. More particularly the use in ultrasonic deformation devices is considered.

1 Claim, 9 Drawing Sheets

METHOD OF LIMITING A CONTACT FORCE

This is a division of application Ser. No. 07/686,864 filed Apr. 15, 1991, now U.S. Pat. No. 5,197,371.

BACKGROUND OF THE INVENTION

The invention relates to a force limiter comprising a control member displaceable with respect to a holder and a chamber, whose shape is determined inter alia by the holder and the control member and which is located between a gas supply and a leakage resistance.

The invention also relates to a device for ultrasonically deforming an article made of synthetic material by means of a sonotrode that can be pressed against the article by a displacement device.

The invention further relates to a method of limiting a contact force with which a first article displaceable by a motor drive is pressed against a second article, the motor drive when switched into operation being switched off in response to the contact force with which the two articles come into contact with each other.

In a so-called force-to-pressure converter known from German Patent Application DE-A1-3326138, an air current at a pressure which is kept constant exerts a force on a ball connected to the control member. A counter force exerted on the control member in the form of a rod ensures, when the force exerted by the air current is exceeded, a relative displacement between the rod (control member) and a housing (holder). The leakage control provided between the ball and an edge of an opening in the housing and located between an air inlet, a chamber and an air outlet connected thereto varies comparatively strongly upon a displacement of the rod with the ball. This involves the disadvantage that the force exerted on the ball by the air current can be kept constant only with great difficulty. Such a disadvantage is only recognized if the recognition is obtained that a substantially constant force is necessary if the known a disadvantage is only recognized if it is realized that a substantially constant force is necessary if the known force-to-pressure converter should be used as a force limiter. This use has not been mentioned, however, in German Patent Application DE-A1-3326138.

Further, a device for ultrasonically deforming, for example, polymeric synthetic material by means of a sonotrode that can be pressed by a displacement device against the synthetic material is known from the book "Ultrasonic Engineering" by J. R. Frederick (1965), pp. 191-192. This book does not state the manner in which the contact force between the sonotrode and the synthetic material to be deformed is limited.

Finally, it should be noted that methods are well known in which, when a first article is pressed against a second article, the motor drive is switched off at the instant at which contact is made between the two objects. However, overshooting of the first article due to the mass inertia involves the risk of an inadmissibly great contact force between the articles.

SUMMARY OF THE INVENTION

The invention has for its object to provide a force limiter, in which the force (pre-stress) exerted by a gas (air) on the control member is substantially independent of relative displacements different in value between the holder and the control member and is therefore constant.

The force limiter according to the invention is for this purpose characterized in that the leakage control comprises a gap which is connected to the chamber, is located between at least one circular-cylindrical inner surface and at least one circular-cylindrical outer surface and is annular transverse to the direction of displacement of the control member.

A particular embodiment of the force limiter, which can be manufactured in a comparatively simple manner, is further characterized in that the chamber accommodates a circular-cylindrical sliding pin, which is slidable parallel to the direction of displacement of the control member by means of gas pressure until it abuts against the control member, while a circular-cylindrical outer surface of the sliding pin and a circular-cylindrical inner surface of the holder define a gap which constitutes a first leakage resistance connected to the chamber and a circular-cylindrical outer surface of the holder and a circular-cylindrical inner surface of the control member define a gap which constitutes a second leakage resistance connected to the first leakage resistance.

A further object of the invention is to provide a device for ultrasonically deforming an article made of synthetic material by means of a sonotrode which can be pressed against the article by a displacement device, the contact force between the sonotrode and the article being kept below an adjustable maximum value.

The device according to the invention is for this purpose characterized in that it is provided with a force limiter comprising a control member displaceable with respect to a holder and a chamber, whose shape is determined inter alia by the holder and the control member and which is located between a gas supply and a leakage control, the leakage control comprising a gap which is connected to the chamber, is located between at least one circular-cylindrical inner surface and at least one circular-cylindrical outer surface and is annular in sectional views transverse to the direction of displacement of the control member.

It is a further object of the invention to provide a method of the kind mentioned in the third opening paragraph, in which the contact force between the two articles is kept below an adjustable maximum value.

The method according to the invention is for this purpose characterized in that the contact force causes a relative displacement between a holder and a control member of a pneumatic force limiter coupled to the first article as soon as a force of pre-stress as soon as a pre-stress force determined by gas pressure of the force limiter coupled to the first article is exceeded and the said displacement is ascertained by a detector which is arranged in the force limiter and supplies a stopping signal to the motor drive of the first article, the time required for stopping the motor drive being shorter than the time required for the relative displacement between the holder and the control member of the pneumatic force limiter.

DETAILED DESCRIPTION OF THE INVENTION

A particularly useful embodiment of the method, which yields a very regular and highly reproducible deforming process when synthetic materials are deformed ultrasonically, is further characterized in that, as soon as the stopping signal is supplied by the detector to the motor drive, the sonotrode subjected to ultrasonic vibrations is pressed into the synthetic material of the second article with a force which is determined inter alia by the force of pre-stress of the force limiter and the weight of the sonotrode and the control member, the motor drive being switched on again only when the detector ascertains that the relative displacement between the holder and the control member has fallen below a given threshold value due to the deformation of the second article.

Another particularly useful embodiment of the force limiter, which can be manufactured in a comparatively simple manner, is further characterized in that the chamber accommodates a circular-cylindrical sliding pin, which is slidable parallel to the direction of displacement of the control member by means of gas pressure until it abuts against the control member, while a circular-cylindrical outer surface of the sliding pin and a circular-cylindrical inner surface of the holder constitute a first gap connected to the chamber and a circular-cylindrical outer surface of the holder and a circular-cylindrical inner surface of the control member constitute a second gap shaped leakage control connected to the first gap shaped leakage control.

Figure 1:
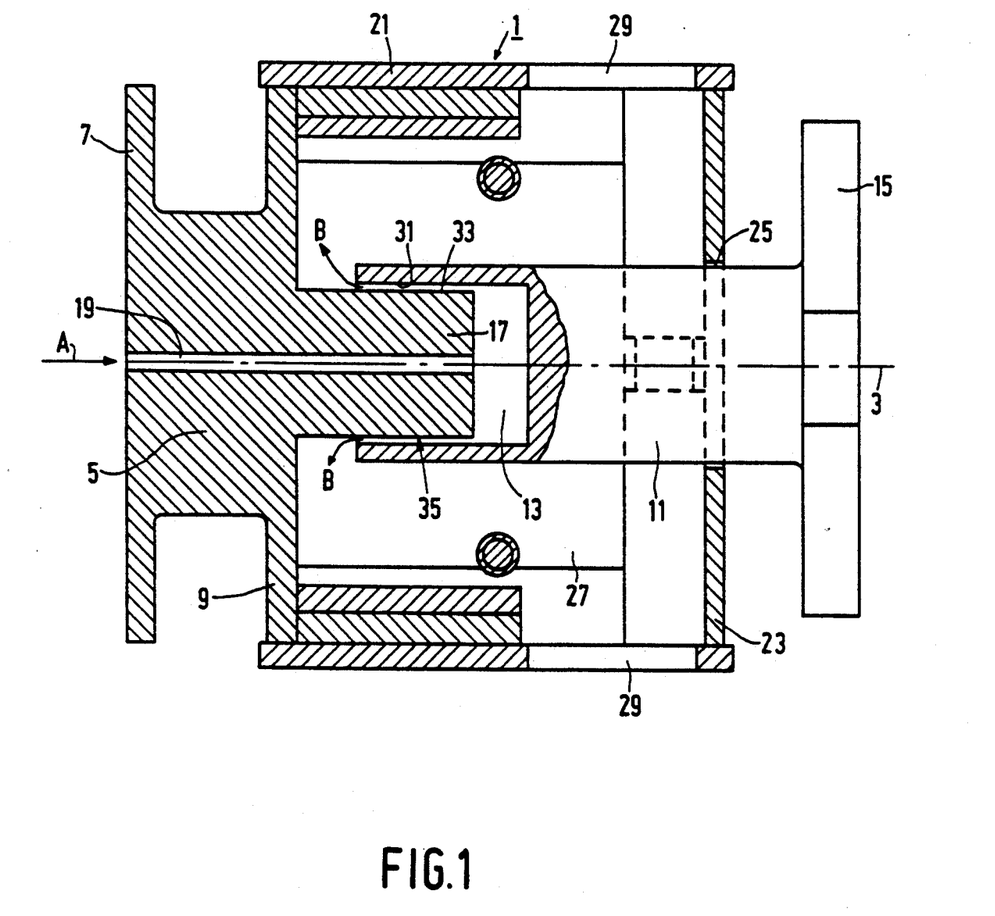
FIG. 1 shows diagrammatically the basic force limiter according to the invention.
Figure 2:
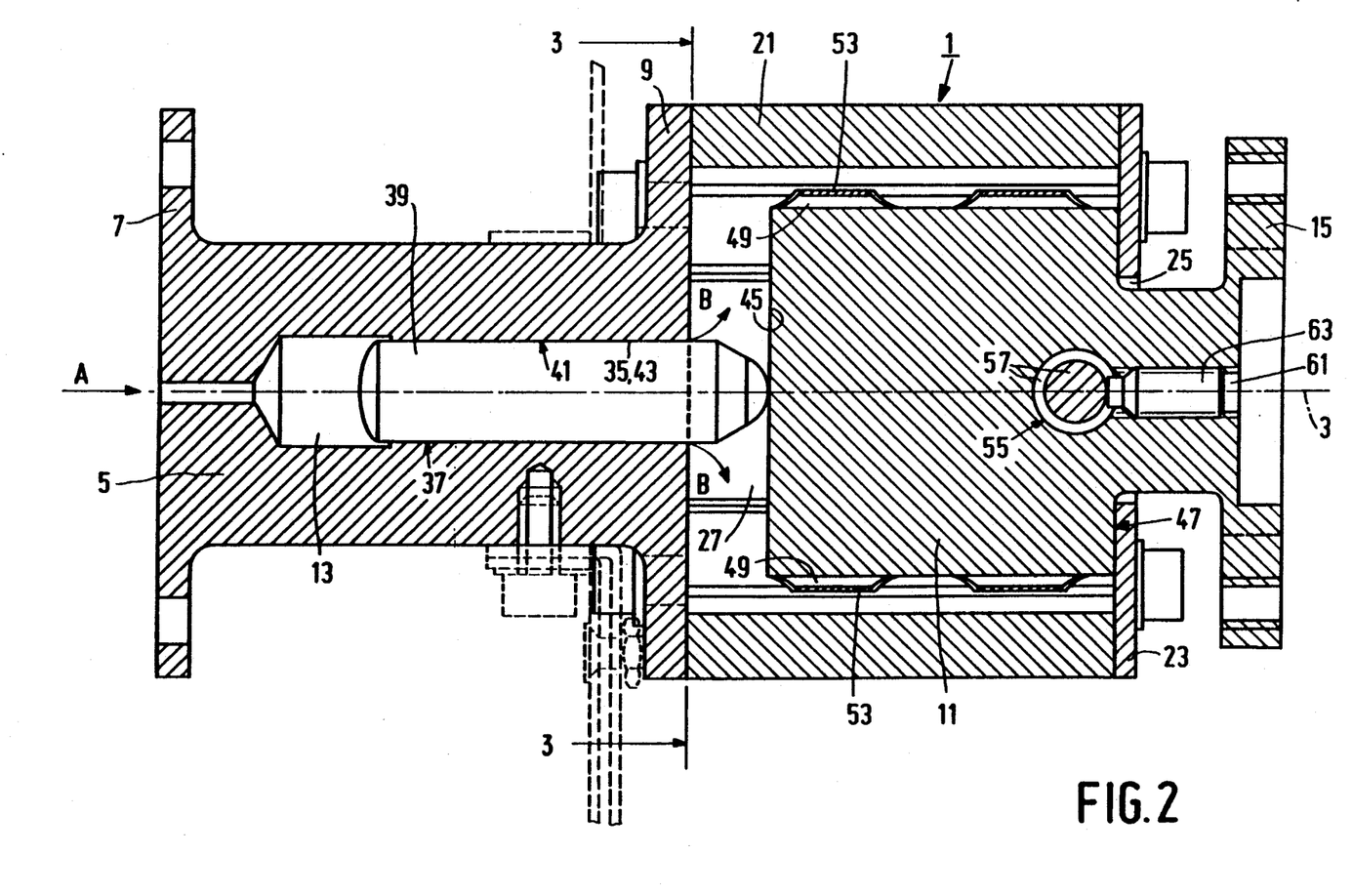
FIG. 2 is a longitudinal sectional view of a first embodiment of the force limiter.
Figure 3:
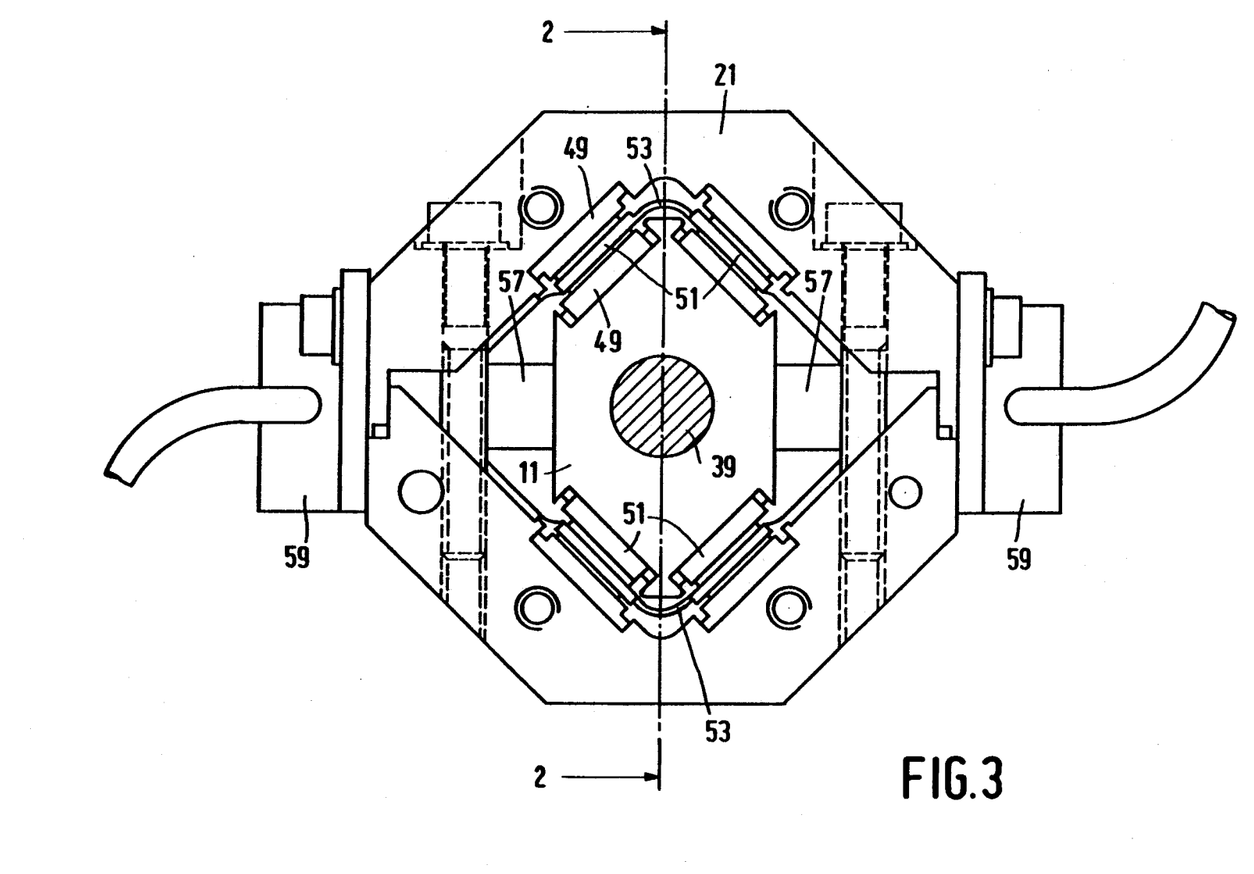
FIG. 3 shows a cross-section taken on the line II—III of the force limiter shown in FIG. 2.

The invention will be described more fully with reference to the drawing, in which:

A current limiter 1, the principle of which is shown in FIG. 1, comprises a holder 5 rotation-symmetrical to a shaft 3 and having flanges 7 and 9 as well as a control member 11 also rotation-symmetrical to the shaft 3. The control member 11 is provided with a circular-cylindrical chamber 13 and with a flange 15. The holder 5 has a circular-cylindrical projection 17 reaching into the chamber 13 of the control member 11. The holder 5 accommodates an inlet duct 19, which can be connected to a source of substantially constant air pressure, such as a load of compressed air of, for example, a robot. The duct 19 connects the chamber 13 with the source of compressed air not shown. The holder 5 and the control member 11 are displaceable with respect to each other in the direction of the shaft 3. The flange 7 of the holder 5 has secured to it a divided housing 21 having a cover 23 provided with an opening 25, through which the control member 11 is passed into a space 27. The space 27 is ventilated with respect to the environment by means of openings 29 in the housing 21. A gap 35, which is annular in sectional views transverse to the direction of displacement (shaft 3) of the holder and the control member, is located between a circular-cylindrical inner surface projection 17 of the holder 5. The annular and circular-cylindrical gap 35 constitutes a leakage control or restriction between the chamber 13 and the space 27 communicating with the environment. Arrows A and B indicate the air direction when the force limiter is in operation. The control member is pneumatically prestressed during operation with a force of pre-stress $F_v$ equal to the product of the pressure of the compressed air and the surface area of a cross-section of the chamber 13. The value of the restriction 35 is such that a comparatively low power is required from the source of compressed air and the smallest possible quantity of air leaks away to the environment. In fact this is always the case with accurate tolerances (gap thickness about 5 um) of the sliding guide between the holder and the control member. A particular property of the annular and circular-cylindrical gap 35 consists in that the air resistance substantially does not vary upon relative displacement of the holder and the control member. This means that for a given trajectory of relative displacements of the holder and the control member the force with which the control member 11 is pressed against an article with a continuing movement of the holder 5 can be kept substantially constant. The flange 7 may be secured, for example, to an arm or a screw spindle of a robot, while the flange 15 has coupled to it a tool, such as, for example, a sonotrode of an ultrasonic deformation device. In FIG. 1, the dimensions of the gap 35 are greatly exaggerated; In FIGS. 2 and 3, the gap 35 is not visible. Although this is not indicated in FIG. 1, the relative movement between the holder and the control member is limited by abutments or stopping members.

In the first embodiment of the force limiter shown in FIGS. 2 and 3, reference numerals corresponding to FIG. 1 are used as far as possible. The annular-cylindrical outer surface 37 of a circular-cylindrical sliding pin 39 and a circular-cylindrical inner surface 41 of a bore 43 in the holder 5 now communicates with the chamber 13. The air current is indicated by the arrows A and B. During operation, the sliding pin 39 is pressed by the compressed air against a wall 45 of the control member 11 with a force equal to the product of the air pressure and the surface area of a cross-section of the sliding pin 39 at right angles to the shaft 3. In a neutral operating position, the cover 23 a shoulder 47 of the control member 11 engages the cover 23.

Both the control member 11 and the housing 21 are provided with strip-shaped rolling tracks 49. There are four pairs of rolling tracks 49 in all (Cf. FIG. 3), over which roll and bearing pins 51 enclosed in bearing cages 53- The space 27 is ventilated with respect to the environment by means of openings in the housing 21 not visible in FIGS. 2 and 3. The control member 11 is provided with a bore 55, which serves as a guide and a support for a circular steel pin 57 having a locally restricted cross-section. The pin 57 together with a detector forms, part of an inductive position switch. The indication coils of the detector, are located in boxes 59 on either side of the housing 21 (cf. FIG. 3). The position switches are of a commonly used kind. The control member 11 is provided with a bore 61 accommodating an adjustment screw 63, which keeps the thicker part of the pin 57 pressed against the inner wall of the bore 55. The induction coils arranged in an the boxes 59 are located at such a position along the axis 3 that an electrical signal is generated at the instant at which the shoulder 47 of the control member 11 becomes separated from the cover 23.

Figure 4:
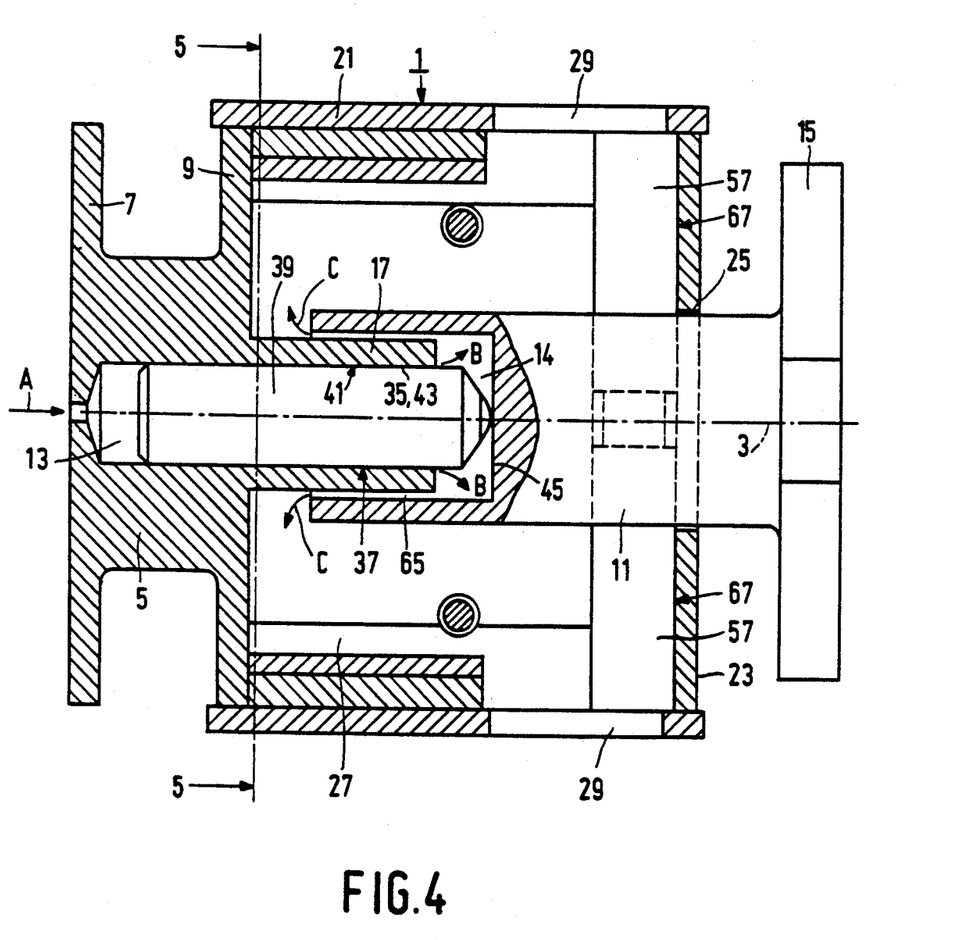
FIG. 4 is a longitudinal sectional view of a second embodiment of the force limiter.
Figure 5:
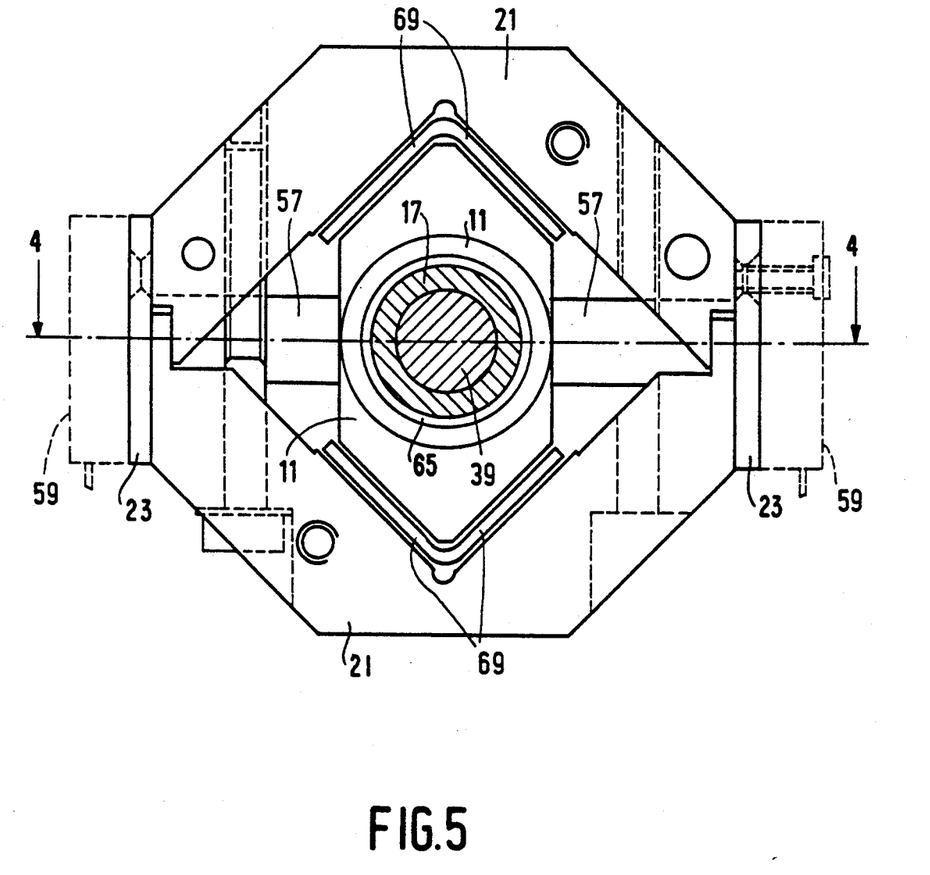
FIG. 5 shows a cross-section taken on the line V—V of the force limiter shown in FIG. 4.

For the second embodiment of the force limiter, shown in FIGS. 4 and 5, the same reference numerals are used as in FIGS. 1 to 3 as far as possible. The wall 45 against which the sliding pin 39 is pressed constitutes the boundary of a chamber 14 in the form of a circular-cylindrical bore in the control member 11.

Referring to FIGS. 4 and 5. The chamber 13 communicates with the chamber 14 through the gap 35. A further annular circular-cylindrical gap 65 is located between the inner surface of the chamber 14 and the outer surface of the projection 17. The air current is indicated by the arrows A, B and C. The direction of the control member 11 is guided in the housing 21 in a conventional manner to be described. The size of the gap 65 is not critical as far as the guiding of the control member 11 is concerned and as far as tile flow rate of the air current is concerned. The gap 35 constitutes such a large restriction for the air current that a comparatively small quantity of air flows away. The first leakage control (gap 35) is therefore connected through the chamber 14 to the second leakage control (gap 65). Due to the fact that the control member 11 encircled the projection 17 of the holder 5, a comparatively short construction is obtained. However, the first embodiment of the force limiter shown in FIGS. 2 and 3 has the advantage that it is less sensitive to alignment errors of the holder 5 with respect to the control member 11. In the neutral operating position, the control member 11 engages the cover 23 with one side 67 of the pin 57. In the neutral position during operation, the beginning of a relative displacement is detected by a position switch of the same kind as used the force limiter shown in FIGS. 2 and 3. The control member 11 is guided in the housing 21 by means of two pairs of needle bearings designated in FIG. 5 by reference numeral 69.

Figure 6:
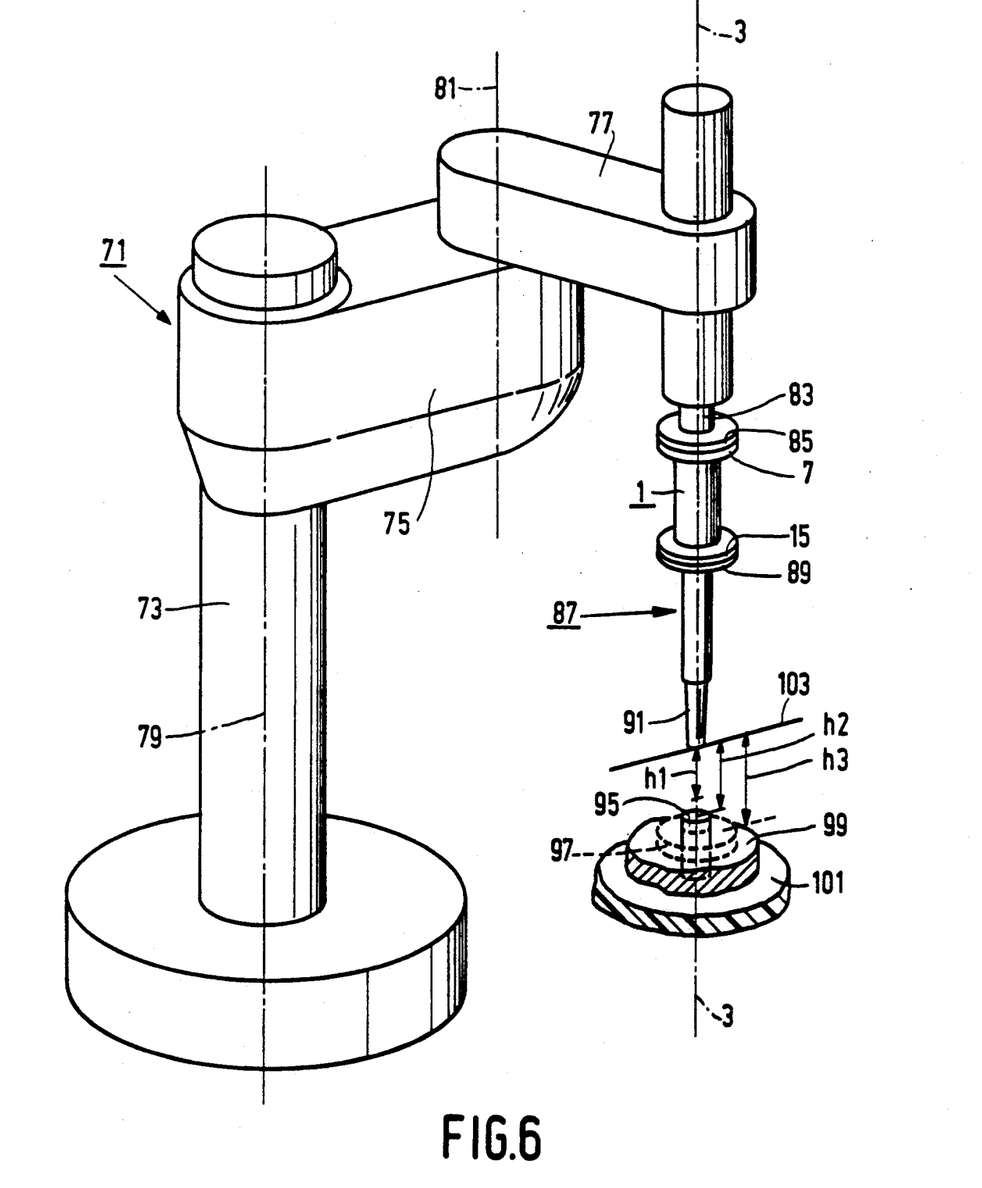
FIG. 6 is a perspective view of a device provided with a force limiter as shown in one of the preceding Figures and intended to deform an article ultrasonically.
Figure 7:
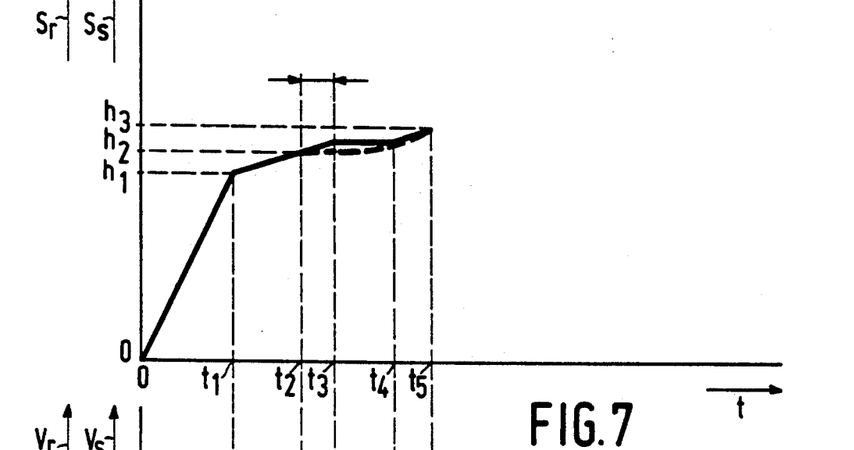
FIG. 7 shows a path-time diagram relating to the device shown in FIG. 6.
Figure 8:
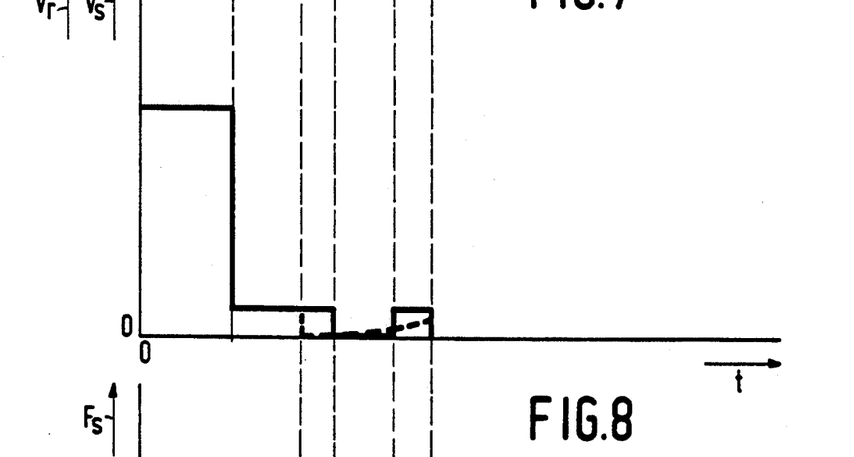
FIG. 8 shows a speed-time diagram corresponding to the diagram shown in FIG. 7.
Figure 9:
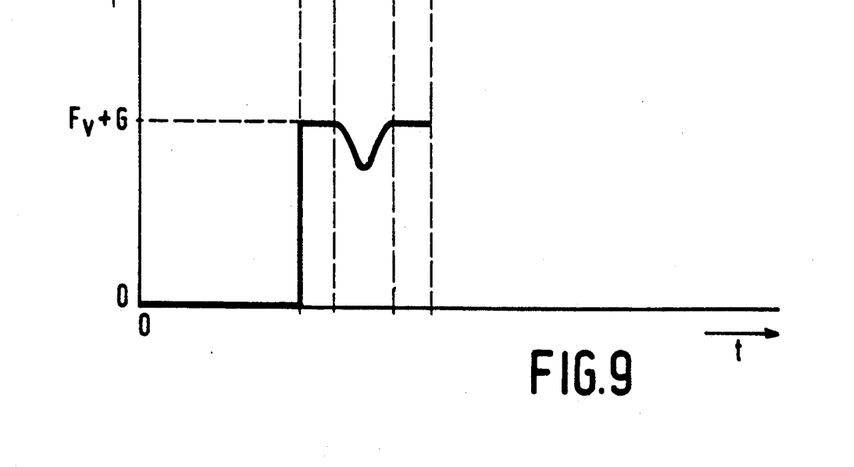
FIG. 9 shows a force-time diagram corresponding to the diagram shown in FIGS. 6 and 7.

A device according to the invention shown in FIG. 6 for ultrasonically deforming an article comprises a manipulator or robot 71 (displacement device) having a vertically arranged column 73. The column 73 carries two arms 75 and 77, of which the arm 75 is rotatable about a vertical axis 79 and the arm 77 is rotatable about a vertical axis 81 relative to the arm 75. A screw spindle 83 with a flange 85 displaceable along the vertical axis 3 is journalled in the arm 77. The flange 7 of the force limiter 1 is secured to the flange 85. An ultrasonic vibration device 87 has a flange 89 and through which it is connected to the flange 15 of the force limiter 1. The vibration device 87 is provided with a sonotrode 91, which is displaceable along the axis 3. Both the robot 71 and the vibration device 87 are of a conventional kind, as described in European Patent Application EP-A1-0188863 in the name of Adept Technology Inc. and in the book "Ultrasonic Engineering" by J. R. Frederick (Library of Congress, Catalog Card Number: 65-14257), respectively. The operation of the device shown in FIG. 6 will now be described with reference to FIGS. 6 to 11 in the practical case in which a journal 95 of synthetic material must be provided with a shoulder 97 to connect a metal plate 99 to a plate 101 of synthetic material, of which the journal 95 forms an integral part. The sonotrode 91 is initially at the level of a reference line 103 when the screw spindle 83 of the robot starts its downward movement. The synthetic material used in the present case is a thermoplastic, such as, for example, a polycarbonate. In FIGS. 7 and 8, the displacement of the screw spindle ($S_r$) and the sonotrode ($S_s$) along the axis 3 and the speed of the screw spindle ($V_r$) and the sonotrode ($V_s$), respectively, are plotted as a function of time (t) as the sonotrode 91 covers a trajectory ($h_1$-$h_2$-$h_3$) in order to deform the journal 95. The control of the movement of the sonotrode 91, the screw spindle 83 and also the control of the motor drive of the screw spindle 83 are illustrated by the flow diagram in FIG. 10 and the control circuit diagram in FIG. 11. The motor drive of the screw spindle 93 is of a kind already described in Netherlands Patent Application No. 8701183 comprising two identical brushless direct current motors. A method is chosen, in which the speed of the screw spindle 83 ($V_r$) and the sonotrode 91 ($V_s$) is kept at a constant comparatively high value in the time period o-$t_1$ and is then reduced in the time period $t_1$-$t_2$ to a constant comparatively low value during approach. In the time period $t_2$-$t_3$-$t_4$-$t_5$, $V_s$ also depends upon the kind of thermoplastic, while $V_r$ also depends upon whether the position switch in the force limiter responds or does not respond.

It should be noted that in the following description an embodiment of the method according to the invention is also exemplified. If in fact the sonotrode 91 is considered as a first article and the journal 95 is considered as a second article, then in a general sense we are concerned with a method of limiting a contact force with which a first article displaceable by a motor drive is pressed against a second article. In this case, it is assumed that the journal 95 is effectively not deformed (softened) by the sonotrode and a comparatively hard collision takes place.

Figure 10:
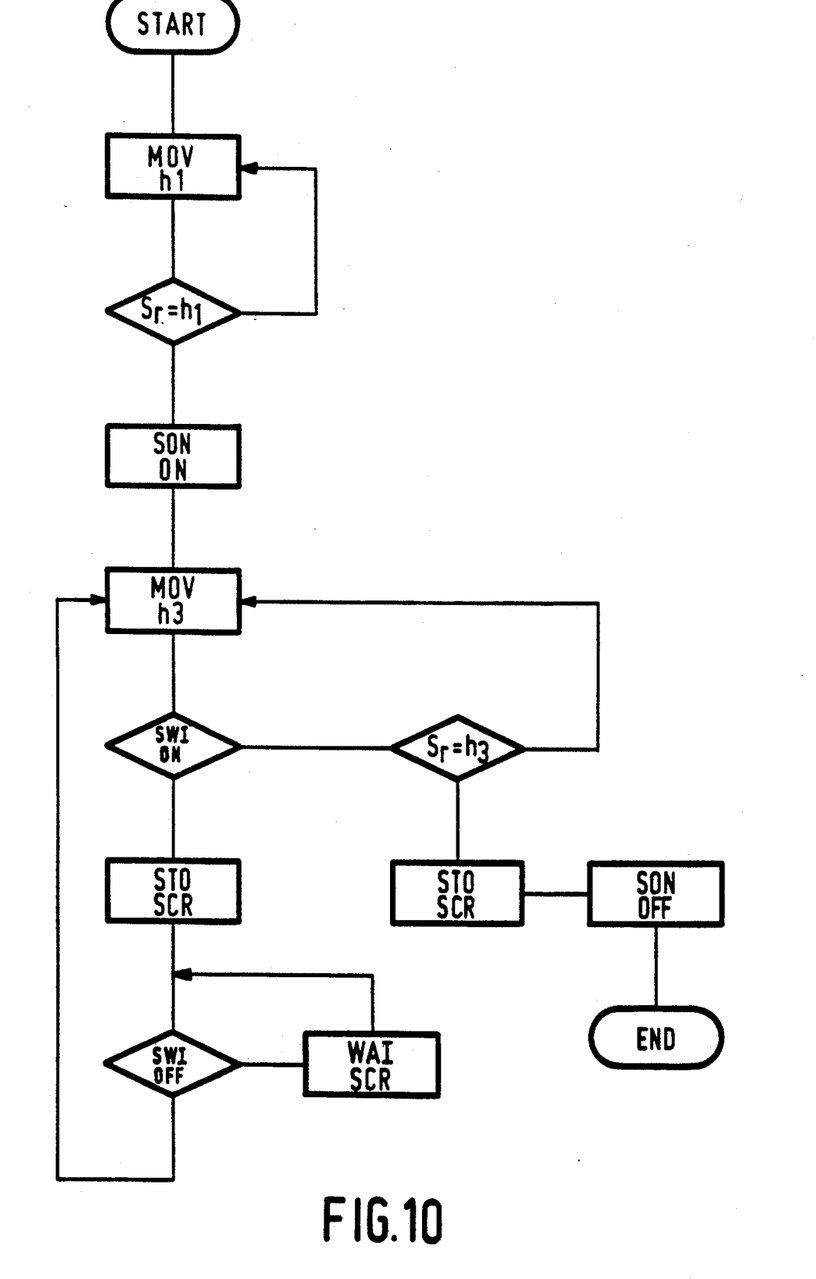
FIG. 10 shows a current diagram relating to a method carried out by means of the device shown in FIG. 6.
Figure 11:
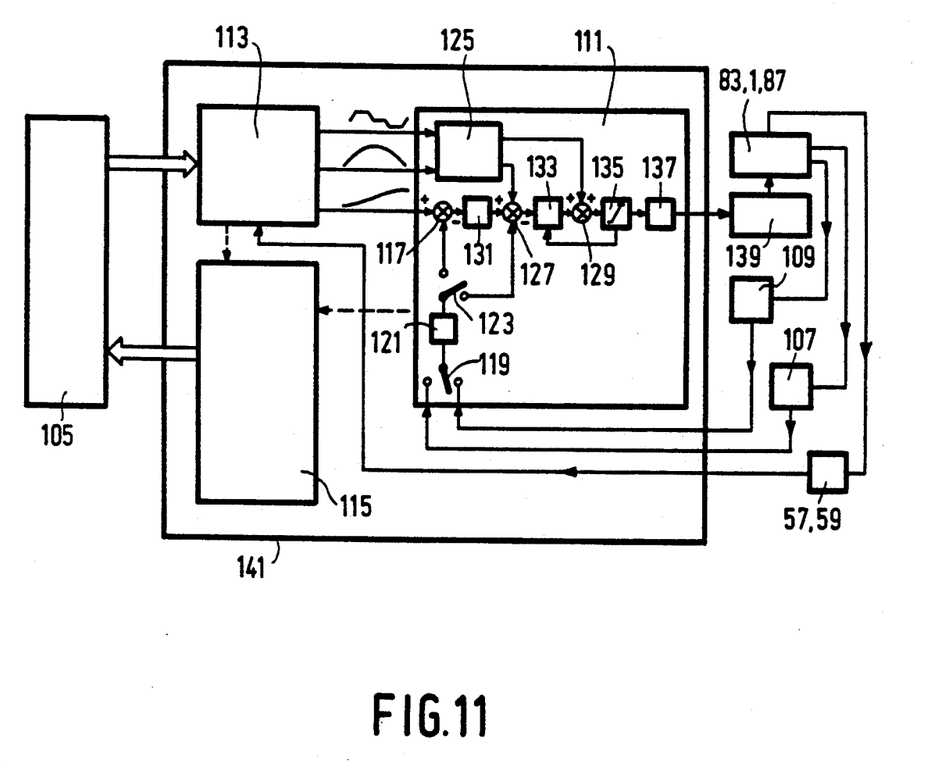
FIG. 11 shows a control circuit relative to the device shown in FIG. 6.

For the sake of simplicity, the displacement device for the sonotrode in the form of a motor drive and a screw spindle displaceable thereby, the force limiter and the vibration device with sonotrode are together represented in the control circuit of FIG. 11 as a single block with reference numerals 83,1,87. The downward movement along the shaft 3 of the screw spindle 83 and hence the sonotrode 91 is controlled by means of a microprocessor 105, for which the flow diagram of FIG. 10 applies. The starting point for the sonotrode lies at the level of the reference line 103 in FIG. 6. The movement of the sonotrode is followed by means of an analogue position sensor 107 and an analogue speed sensor or tachometer 109 (cf. FIG. 11). The position switch 57,59 supplies a stopping signal as soon as a relative displacement between the holder 5 and the control member 11 occurs. Further a digital regulator 111, a trajectory generator 113 and a diagnosis block 115, by which the state of the serve control is determined and passed on to the microprocessor 105, form part of the control circuit. The trajectory generator 113 supplies a signal corresponding to the desired position of the sonotrode to the position loop of the digital regulator 111, feedback taking place via the position sensor 107, which supplies a signal to a comparator 117. The analogue output signal of the position sensor 107 is derived by means of a multiplex switch 119 and is then digitized in an analogue-to-digital (A/D) converter 121. The digital output signal of the A/D converter 121 is supplied via a further multiplex switch 123 synchronized with the switch 119 to the position loop or the speed loop of the digital regulator 111. The multiplex switch 119 in fact derives per cycle a signal both from the position sensor 107 and from the tachometer 109. The analogue output signal of the tachometer 109 is also digitized in the A/D converter 121. The trajectory generator 113 also supplies signals corresponding to the desired speed and the desired acceleration to a forward coupling device 125 of the digital regulator 111. The speed output signal and the acceleration output signal of the forward coupling device 125 are supplied to a comparator 127 and to a summing device 129, respectively. The digital speed signal fed back is supplied to the comparator 127 via the multiplex switch 123. The so-called open loop of the digital regulator 111 accommodates in order of succession a proportional regulator 131, a proportional integrating regulator 133 and a limiting circuit 135. The output signal of the limiting circuit 135 is supplied to a digital-to-analogue (D/A) converter 137. The D/A converter 137 supplies an output signal to an amplifier 139, which is coupled to the motor drive of the displacement device. The part of the control circuit indicated within a frame 141 is provided on a single printed circuit board as a unit of a conventional kind.

When a MOV $h_1$ instruction is executed by the microprocessor 105, the sonotrode 91 is displaced from the reference line 103 over a distance h at a constant comparatively high speed $V_1$. At the instant $t_1$, the position sensor 107 supplies a signal corresponding to the covered path $S_r = S_s = h_1$. The vibration device 87 of the sonotrode 91 is switched on, while subsequently, when the sonotrode is activated, the speed $V_r$ of the screw spindle 83 and the speed $V_s$ of the sonotrode 91 are reduced to the comparatively low value $V_2$. After the sonotrode has covered a trajectory equal to $(h_2-h_1)$, it touches the journal 95 at the instant $t_2$. Since at that time the sonotrode is activated, the process of softening the journal 95 of synthetic material starts upon further contact with the sonotrode. When the sonotrode 91 touches the journal 95 and the latter therefore acts as the abutment stop for the control member 11, a relative movement takes place between the holder 5 and the control member 11 so that the position switch 57,59 supplies a stopping signal to the trajectory generator 113. It is assumed that the response time of the position switch amounts to $(t_3-t_2)$ and that the motors of the displacement device stop the screw spindle 83 and hence the holder 5 substantially immediately. After the holder 5 has been stopped, the sonotrode 91 sinks into the journal 95 with a force $F_s = F_v + G$ (cf. FIG. 9), where $F_v$ is the pneumatic force of pre-stress of the force limiter 1 and G is the weight of the vibration device 87 and the part of the force limiter connected thereto, i.e. the control member 11. This means that the contact force between the sonotrode 91 and the journal 95 cannot become greater than $F_v + G$, provided that the braking time and hence the braking trajectory of the motors is sufficiently short. The microprocessor 105 executes the instruction MOC $h_3$ at a speed $V_2$ until the position switch 57,59 is switched on, which is indicated in the flow diagram of FIG. 10 by the conditional test SWI ON. In the case of a positive conditional test result, the screw spindle motors are stopped (STO SCR) and the sonotrode 91 sinks with a contact force $F_v + G$ into the journal 95 until the relative displacement between the holder 5 and the control member 11 obtained by the abutment against the journal 95 has been eliminated by the displacement of the control member 11 with a stationary holder 5. The position switch 57,59 switches off at that instant, which is ascertained by the conditional test SWI OFF. As can be seen from the flow diagram, after the time period $(t_4-t_3)$ from the time $t_4$, the screw spindle 83 is then moved downwards at the speed V In FIG. 7, in the time period $(t_2-t_5)$ the displacement $S_r$ of the screw spindle 83 is indicated by a full line and the displacement $S_s$ of the sonotrode 91 is indicated by a dotted line. This is also the case in FIG. 8. The speed $V_2$ is chosen so that the steepness of the $S_r$ line is sufficient to cause the screw spindle 83 to lead with respect to the sonotrode 91. In this manner, the sonotrode 91 can continue to sink into the journal 95 until $S_r$ is $h_3$, which is ascertained through a conditional test. Subsequently, the screw spindle is stopped and the sonotrode is deactivated. In the case in which the sonotrode 91 sinks so slowly into the journal 95 that the screw spindle 83 continues to lead, the screw spindle is stopped only after it has been ascertained that $S_r = h_3$. It also depends upon the kind of synthetic material which is deformed and the sum of the forces $F_v$ and G whether or not the screw spindle 83 is overtaken by the sonotrode 91. Depending upon the location at which the position switch 57,59 is provided on the force limiter 1, the screw spindle 83 is displaced again when the control member 11 again engages the holder 5 or with a given relative displacement between the holder and the control member. The associated threshold value, which is larger than or equal to zero, can even be adjusted if the position switch is displaceable on the force limiter. By the use of two position switches arranged at different locations in a direction parallel to the shaft 3, a limitation of the force on the sonotrode can be obtained between a maximum value and a minimum value if use is made of a so-called speed feedback in the control circuit. Synthetic materials suitable for the deforming method described are synthetic materials having a macromolecular character. These materials can be both thermoplastics and thermosetting agents. Contact with an ultrasonically vibrating sonotrode causes local heating by friction and a reduction of the bonding between the molecules in the chains. The deformation can be used not for only joining a metal and a synthetic material, but also for bonding synthetic materials to each other.

The method described of limiting the force with which two articles come into contact with each other is generally usable for comparatively soft and hard articles. This need not involve softening or plastic deformation of the articles. The braking path of the motor drive of the first article in this case is so short that damage of the second article is avoided. The flow diagram of FIG. 10 is then simplified to the conditional test SWI ON and the instruction STO SCR as soon as the position switch switches on. The sonotrode may be replaced by a tool or load as the first article if a robot of the kind described with reference to FIG. 6 is used for carrying out the method.

It should be noted that the relative displacement between the holder 5 and the control member 11 is limited so that no hard collision takes place between these two. A sufficiently short braking time and braking path of the drive guarantees that this condition is satisfied. The force of pre-stress of the force limiter can be regulated by increasing or decreasing the gas pressure. It is possible to arrange a number of pins 39 in one force limiter and thus to obtain a comparatively great maximum force of pre-stress.

We claim:

1. A method of limiting a constant force with which a first article displaceable by a motor drive is pressed against a second article, the motor drive switched into operation being switched off by means of the contact force with which the two articles come into contact with each other, whereby the contact force causes a relative displacement between a holder and a control member of a pneumatic force limiter coupled to the first article as soon as a force of pre-stress of the force limiter, determined by gas pressure, is exceeded and in that said displacement is ascertained by means of a detector arranged in the force limiter, which detector supplies a stopping signal to the motor drive of the first article, the time required for stopping the motor drive being shorter than the time required for the relative displacement between the holder and the control member of the pneumatic force limiter, said force limiter comprises a chamber whose volume is determined by the holder and the control member and which is located between a gas supply and a leakage control, the leakage control comprises a gap which is connected to the chamber, is located between at least one circular-cylindrical inner surface and at least one circular-cylindrical outer surface, is annular in sectional view transverse to the direction of displacement of the control member and has a gas resistance that is substantially constant upon relative displacement of the holder and the control member in the axial direction of said displacement.

The method of claim 1, wherein the first article is a sonotrode and the second article is formed of a synthetic material that is deformable by means of ultrasonic vibrations of the sonotrode.

* * * * *